United States Patent [19]
Gerson

[11] 3,718,669
[45] Feb. 27, 1973

[54] 4,4-BIS (2-NITRO-X-HALO-ANILINO)-1,1 DIANTHRAQUINONYL

[75] Inventor: Herman Gerson, New York, N.Y.

[73] Assignee: Allied Chemical Corporation, New York, N.Y.

[22] Filed: April 30, 1971

[21] Appl. No.: 139,189

[52] U.S. Cl. ..................260/367, 260/38, 260/39 P, 260/41 C
[51] Int. Cl. ..............................................C09b 1/32
[58] Field of Search......................................260/376

[56] References Cited

UNITED STATES PATENTS 3,194,820   7/1965   Grezat..............................260/367

*Primary Examiner*—Henry R. Jiles
*Assistant Examiner*—E. Jane Skelly
*Attorney*—Jay P. Friedenson

[57] ABSTRACT

A compound of the formula

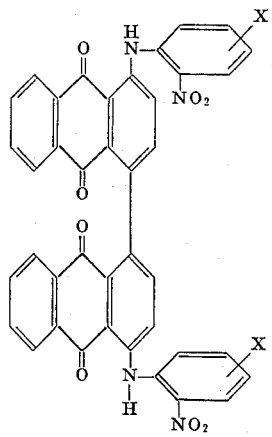

wherein X is independently fluorine, chlorine or bromine, is useful as a pigment imparting desirable red colorations to a variety of synthetic resins. These new pigments are characterized by excellent mass tone, fastness to light and to lacquer solvents.

6 Claims, No Drawings

4,4-BIS (2-NITRO-X-HALO-ANILINO)-1,1 DIANTHRAQUINONYL

BACKGROUND OF THE INVENTION

Synthetic resins comprise a large and commercially valuable class of materials. Included within this class are thermoplastic polymeric resins such as polymers and co-polymers of styrene, methyl methacrylate, vinyl chloride, vinylidene chloride, ethylene, propylene, fluorocarbons, cellulose esters and alkylene oxides. Also included within this class are thermosetting polymeric resins such as polymers and co-polymers of silicones, urea formaldehyde, melamine formaldehyde, melamine urea, phenol formaldehyde and cross-linkable acrylic monomers. Plastic substances of this class possess the characteristic property of flowing at least under the initial application of heat and/or pressure, and consequently they have been employed extensively in various molding, coating and the like processes to form a myriad of useful articles. In many instances, these synthetic resins have been colored in order to increase their utility and attractiveness.

The range of colorants suitable for pigmenting or coloring synthetic resins is limited, however. Because of the trend to use higher processing temperatures and pressures, as well as the insistence on better fastness properties, organic colorants which were formerly capable of withstanding processing and exposure conditions without alteration of shade or loss of fastness or other desirable properties, have proven to be unsatisfactory to meet current demands.

Inorganic pigments, such as carbon black, iron oxides, cadmium selenides, and the like, have been utilized to impart color to some synthetic resins. However, inorganic pigments give colorations lacking in brightness and clarity which characteristics are desirable in many synthetic resin applications.

Due to reactions between the organic pigments and the catalysts, antioxidants, preservatives, fungicides, vulcanizates, and special additives which may be employed in formulating and processing of the synthetic resin compositions, which reactions become increasingly important as the processing conditions and fastness specifications are made more severe, the number of organic pigments suitable for use in coloring such resins has grown smaller.

Recently discovered organic pigments in the quinacridone and isoindolenone families which possess acceptable fastness characteristics are relatively expensive and hence are of limited application.

An object of the present invention, therefore, is to devise new compounds which are effective and economic pigments for synthetic resins.

Another object is to provide compounds which are useful as pigments for synthetic resins and are characterized by excellent mass tone, fastness to light and to lacquer solvents.

A specific object is to provide new compounds which pigment synthetic resins in light-fast red shades which do not bleed when contacted with lacquer solvents.

Other objects of the invention will be apparent from the following description.

DETAILED DESCRIPTION OF INVENTION

In accordance with the present invention, I have discovered that 4,4'-bis-(halo-2-nitroanilino)-1,1'-dianthraquinonyls having the formula

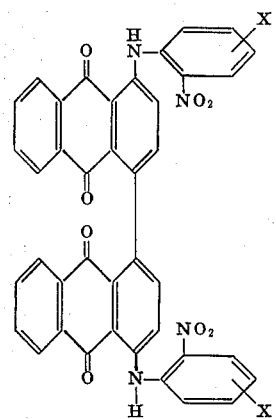

wherein X is independently fluorine, chlorine or bromine, are excellent pigments and, when incorporated into a synthetic resin, color said resin in desirable red shades which possess excellent mass tone, fastness to light and are essentially non-bleeding in character. Moreover, these pigments do not change color when they are mixed with the resins, or with the monomers from which said resins are obtained, or when the pigmented resins are processed under elevated temperature and pressure conditions. The two X atoms may be the same or different. The location of the nitro groups in the 2-positions on the phenylene nuclei, is critical to the obtainment of pigments having the desirable properties described herein.

The novel pigments of this invention may be obtained by condensing 4,4'-diamino-1,1'-dianthraquinonyl with a dihalogenated nitrobenzene containing at least one halogen substituent in an ortho position to the nitro group, optionally in the presence of an inert organic solvent boiling above about 100° C., at elevated temperatures advantageously within the range of about 150° to 250° C., and optionally in the presence of a copper catalyst.

Suitable inert organic solvents which may be employed in the condensation reaction include nitrobenzene, xylene, trichlorobenzene, and dimethylformamide.

The copper catalyst, if employed, may be copper powder, cupric or cuprous salts such as cupric acetate, cupric chloride, cuprous iodide, cuprous bromide, cuprous acetate, and mixtures thereof. The catalyst is preferably employed in finely divided form, preferably in an amount equal to at least one atomic proportion of copper for each molecular proportion of diaminodianthraquinonyl being reacted. Still preferably, an excess of the copper catalyst is employed.

The condensation reaction takes place with the splitting out of hydrogen halide. An acid binding agent, for example, potassium carbonate, pyridine, sodium acetate, or the like, is preferably present to react with the acidic by-product.

The condensation reaction is preferably carried out at temperatures above about 100° C. and still preferably within the range of about 150°–250° C. The reaction proceeds readily at atmospheric pressure.

In an illustrative mode of preparing the novel compounds of this invention, about 15 to 20 parts by weight of 4,4'-diamino-1,1'-dianthraquinonyl, about 25 to 35 parts by weight of 2,4-dichloronitrobenzene, about 4 to 8 parts by weight of potassium carbonate, about 0.05 to 0.1 part by weight of cupric acetate monohydrate, and about 0.01 to 0.05 part by weight of cuprous iodide are admixed with about 180 to 250 parts by weight of nitrobenzene and the mixture heated gradually to, and then maintained at 180° to 210° C., for a period of about 10 to 24 hours. After being cooled to ambient temperatures, the reaction mass is filtered and the filter cake is washed with nitrobenzene. The crude filter cake is reslurried in about 750 to 1250 parts of xylene, agitated for 1 to 3 hours to completely disperse the solids in the slurry, and then filtered. The filter cake is washed with xylene, then methanol or isopropanol and lastly with water. The washed cake may be dried in air or an oven.

Other dihalo-nitrobenzenes than 2,4-dichloronitrobenzene can be used in this process. As typical alternative compounds which can be used, the following may be mentioned:

2,5-dichloronitrobenzene
2,4-difluoronitrobenzene
2,5-dibromonitrobenzene
2-bromo-5-chloronitrobenzene
2-chloro-5-bromonitrobenzene
2-chloro-5-fluoronitrobenzene
2,4-dichloronitrobenzene
2,6-dibromonitrobenzene The novel compounds of this invention possess reddish shades which are yellower than the 4,4'-diamino-1,1'-dianthraquinonyls from which they are derived. They are characterized by their excellent fastness to light and substantial insolubility in common organic solvents for example, benzene, toluene, xylene, acetone, methanol, ethanol, chloroform, aliphatic hydrocarbons and lacquer solvents such as ethyl acetate and butyl acetate.

As is conventional in this art, the pigment compounds are conditioned by converting them into a finely divided form prior to use. Grinding methods, such as acid pasting, ball milling in the presence of water or organic solvents, salt grinding, milling in the presence of organic solvents and steel balls or rods, may be used. The grinding procedures referred to above, usually are effective in reducing the particle size to the micron or submicron range and thus to the pigment form. The pigment compounds may be transferred from an aqueous medium into an organic substratum by the so-called "flushing" procedure. This is also a means of conditioning the crude compound for pigment use.

The incorporation of the 4,4'-bis(halo-2-nitroanilino)-1,1'-dianthraquinonyl pigment compounds of the present invention with synthetic resins may be accomplished by conventional methods. For example, pellets, beads or rods (the usually available forms) of the resin polymers can be surface coated by mixing them with the comminuted pigment in a suitable mixer and feeding the thus coated polymer to a suitable forming apparatus such as a molding press, extruder, or fiber spinner. Another method is grinding a solvent paste of the pigment with a solution of the resin polymer. The resultant dispersion may be used as a coating composition for a variety of substrata. The pigments may be incorporated with a monomer after which the monomer may be polymerized without deleteriously affecting the pigment.

The amount of the novel pigments to be used to color synthetic resin compositions may vary over a wide range. The particular amount used is dependent upon the depth of shade or coloration desired and upon the particular resin and pigment employed. The colorant may be added in extremely minute amounts or very large amounts. The amount is limited only by the compatability of the pigment with the particular resin being colored. This may vary to a considerable degree from resin to resin, as will be evident to those skilled in this art. Thus, for example, light tints, for finished pieces, can be obtained with an amount of pigment as low as 0.0001 part per 100 parts by weight of the resin. Deep shades, or master batches, and the like, are obtainable with amounts of pigment up to 5.0 or more parts per 100 parts by weight of the resin. Master batches may generally be prepared by admixture of the pigment with the resin monomer or polymer in amounts between about 0.5 to about 5.0 parts, preferably between about 1.0 to about 3.0 parts, per 100 parts by weight of the resin monomer or polymer. Products of any desired lighter red shade, may be obtained by mixing the colored master batch, after the usual processing and comminution operations, with unpigmented resin and further processing the mixture, such as by molding, extruding, coating, and the like.

The following examples describe specific embodiments of the invention and illustrate the best mode contemplated for carrying it out. Parts and percentages are by weight and temperatures are given in degrees centigrade, unless otherwise specified.

EXAMPLE 1

A mixture of 17.7 parts of 4,4'-diamino-1,1'-dianthra-quinonyl, 30.5 parts of 2,4-dichloronitrobenzene, 6.6 parts of potassium carbonate, 0.07 part of cupric acetate monohydrate, and 0.03 part of cuprous iodide was heated in about 300 parts of nitrobenzene, over a period of about two hours to 200°. The resulting mixture was filtered and the filter cake was washed with nitrobenzene. The washed cake was reslurried in about 860 parts of mixed xylenes and the slurry agitated for about two hours. The slurry was filtered, the cake washed with xylene, then methanol, and lastly with water. The washed cake was dried.

The product, 4,4'-bis(5-chloro-2-nitro-anilino)-1,1'-dianthraquinonyl, was conditioned to pigment form by adding 8 parts of the product and 0.2 part of sodium chromate to a container half filled with buckshot pellets containing sufficient acetone to just cover the buckshot. The container was sealed and placed on a roller mill and rotated thereon for four days. Thereafter the color slurry was separated from the buckshot by screening, and the slurry diluted with water to about 500 parts by volume. After adding sufficient hydrochloric acid to render the slurry strongly acid to Congo Red indicator, the slurry was boiled for one half hour. The slurry was filtered and the filter cake was washed with water until acid free. The washed cake was reslurried in about 500 parts of water containing one part of sodium carbonate and sufficient aqueous sodium hypochlorite to give a strong positive reaction to potassium iodide indicator. The slurry was boiled for 1 hour, maintaining an excess of sodium hypochlorite in the slurry and then the mass was filtered, washed well with water and dried.

The mass tone of the resulting pigment, determined according to ASTM Standard Test Method D 387–60, Procedure B, Hoover Muller (3 cycles of 50 revolutions) was excellent. The undertone was yellower than that of the diaminodianthraquinonyl pigment.

The new pigment was substantially non-bleeding to both xylene and lacquer solvent. A thermosetting acrylic coating composition pigmented with this new pigment possessed excellent light-fastness.

EXAMPLE 2

In an analogous manner to that described in Example 1 above, but using 2,5-dichloronitrobenzene in place of 2,4-dichlorobenzene, and trichlorobenzene in place of nitrobenzene, a new pigment, 4,4'-bis(4-chloro-2-nitro-anilino)-1,1'-dianthraquinonyl was obtained.

EXAMPLE 3

A mixture of 100 parts of polystyrene pellets and 0.05 part of 4,4'-bis-(5-chloro-2-nitro-anilino)-1,1'-dianthraquinonyl was placed in a metal container which was closed and then tumbled mechanically for 5 minutes to surface coat the resin pigment. Thereafter the coated resin was fed to a laboratory extruder operating at an extrusion temperature of about 600°. The mass was held in the extruder for about 5 minutes, then extruded at slow speed in the form of continuous rods one-eighth inch in diameter. The rods were colored a bright reddish shade and showed no evidence of color (shade) alteration. The rods were pelletized and the colored pellets were fed to an injection molding apparatus operating at 400°. The pellets were formed into plaques colored a red shade which showed no alteration of shade resulting from the molding process. The plaques, when exposed in a Fade-O-Meter for periods of about 300 hours showed no noticable alteration in shade.

EXAMPLE 4

A mixture of 3 parts of 4,4'-bis-(5-chloro-2-nitro-anilino)-1,1'-dianthraquinonyl, 40 parts of a commercially available thermosetting acrylic resin solution containing 50 percent non-volatiles and comprising styrene-modified co-polymers of methacrylate and acrylate esters containing free hydroxyl and carboxyl groups, and 70 parts of xylene, was homogenized by passage through a sand mill. The resulting paste was then mixed with sufficient butylated-amino-formaldehyde condensate solution containing 60 percent non-volatiles ("melamine resin") to produce a coating composition having the following composition:

0.8%   Pigment
 26.4%   Thermosetting Acrylic Vehicle (100% Solids)
 11.3%   Melamine Resin (100% Solids)
 61.5%   Solvent The coating composition was used to coat primed sheet panels in a conventional manner. Following a brief air dry, the coated panels were cured by baking in a drying oven at 120° for 2 hours. The resultant finish had a red mass tone and excellent transparency. The coating had excellent fastness to light.

EXAMPLE 5

A mixture of 0.15 part of 4,4'-bis-(4-chloro-2-nitro-anilino)-1,1'-dianthraquinonyl, 10 parts of cellulose acetate butyrate resin and 90 parts of toluol, was ground in a ball mill for 24 hours. The resultant mixture was reduced in a conventional manner to a finish having the following composition:

0.5%    Pigment
  9.0%    Plasticizer (butylbenzylphthalate)
  6.35%   Cellulose Acetate Butyrate Resin
 15.75%   Acrylic Resin (100% Solids)
 68.85%   Solvent Blend (Solvent No. 10 of U.S. Pat. No. 2,934,510)

About 0.5 part of aluminum flake was added to 100 parts of the above finish which was then applied over a highly reflective metallic substrate. The resulting "acrylic lacquer" coating produced a rich red metallic finish with high gloss possessing excellent light-fastness. This polychromatic metallic finish also possessed the desirable "flop" characteristic.

I claim:

1. A compound of the formula

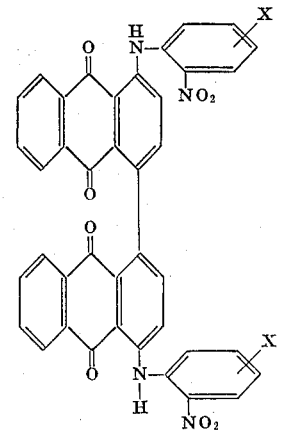

wherein X is independently fluorine, chlorine or bromine.

2. A compound as described in claim 1 wherein X is fluorine.

3. A compound as described in claim 1 wherein X is chlorine.

4. A compound as described in claim 1 wherein X is bromine.

5. A compound as described in claim 3 wherein the chlorine is attached to the 4 position of the phenylene nucleus.

6. A compound as described in claim 3 wherein the chlorine is attached to the five position of the phenylene nucleus.

* * * * *